(12) United States Patent
Alfano et al.

(10) Patent No.: US 10,027,416 B2
(45) Date of Patent: Jul. 17, 2018

(54) ALL-OPTICAL MODE DIVISION DEMULTIPLEXING

(71) Applicant: Corning Incorporated, Corning, NY (US)

(72) Inventors: Robert R Alfano, Bronx, NY (US); Giovanni Milione, Franklin Square, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/329,074

(22) PCT Filed: Jul. 29, 2015

(86) PCT No.: PCT/US2015/042562
§ 371 (c)(1),
(2) Date: Jan. 25, 2017

(87) PCT Pub. No.: WO2016/018966
PCT Pub. Date: Feb. 4, 2016

(65) Prior Publication Data
US 2017/0214466 A1  Jul. 27, 2017

Related U.S. Application Data

(60) Provisional application No. 62/030,182, filed on Jul. 29, 2014.

(51) Int. Cl.
*H04B 10/60* (2013.01)
*H04B 10/2581* (2013.01)
*H04J 14/04* (2006.01)

(52) U.S. Cl.
CPC .......... *H04B 10/2581* (2013.01); *H04J 14/04* (2013.01)

(58) Field of Classification Search
CPC .............................. H04B 10/2581; H04J 14/04
(Continued)

(56) References Cited

U.S. PATENT DOCUMENTS 7,327,914 B1 * 2/2008 Kahn .................... G02B 6/4206
                                                    385/15
9,479,285 B2 * 10/2016 Djordjevic .............. H04J 14/04
(Continued)

OTHER PUBLICATIONS

Notification of Transmittal of The International Search Report and Written Opinion of the International Searching Authority, or the Declaration, dated Jul. 29, 2015 pp. 1-12, International Application No. PCT/US2015/042562, European Patent Office, The Netherlands.

(Continued)

*Primary Examiner* — Ken N Vanderpuye
*Assistant Examiner* — Dibson Sanchez
(74) *Attorney, Agent, or Firm* — Gregory V. Bean

(57) ABSTRACT

Methods of decoding N superimposed coherent optical transmission modes transmitted along a multimode optical fiber are provided where the optical signal detector comprises coherent detection hardware and a digital signal processor. The optical signals are split into N optical detection channels of the coherent detection hardware, which is used to measure the phase and amplitude of the output optical signals as a vector field matrix $[\hat{e}]_{1 \times n}$. The digital signal processor determines the output principal states $[PS_{out}]_{1 \times n}$ of the output optical signals from the principal state eigenvectors of an output matrix corresponding to the N propagating optical signals at the receiving portion of the data transmission link and extracts the input optical signals $[M]_{In}$ from the output optical signals using the output principal states $[PS_{out}]_{1 \times n}$, the vector field matrix $[\hat{e}]_{1 \times n}$ of the output optical signals, and a time delay $\tau$ of each output (Continued)

signal. Optical signal receivers for the execution of the methodology disclosed and contemplated herein are also provided.

14 Claims, 1 Drawing Sheet

(58) Field of Classification Search
USPC .................................. 398/44, 143, 202–214
See application file for complete search history.

(56) References Cited

U.S. PATENT DOCUMENTS

| | | | | |
|---|---|---|---|---|
| 9,525,508 | B2* | 12/2016 | Segev ..................... | H04J 14/04 |
| 9,712,242 | B2* | 7/2017 | Rapp ...................... | H04B 10/27 |
| 2007/0206963 | A1* | 9/2007 | Koc ........................ | H04B 10/61 |
| | | | | 398/202 |
| 2009/0129788 | A1* | 5/2009 | Seimetz ................. | H04B 10/60 |
| | | | | 398/208 |
| 2009/0208224 | A1* | 8/2009 | Kikuchi ............... | H04B 10/672 |
| | | | | 398/141 |
| 2010/0329670 | A1* | 12/2010 | Essiambre ......... | H04B 10/2581 |
| | | | | 398/43 |
| 2010/0329671 | A1* | 12/2010 | Essiambre ............... | G02B 6/14 |
| | | | | 398/44 |
| 2011/0243574 | A1* | 10/2011 | Essiambre ......... | G02B 6/29311 |
| | | | | 398/200 |
| 2011/0274435 | A1* | 11/2011 | Fini .................... | G02B 6/02042 |
| | | | | 398/139 |
| 2012/0008961 | A1* | 1/2012 | Chen .................. | H04B 10/1121 |
| | | | | 398/119 |
| 2012/0177365 | A1* | 7/2012 | Winzer ............. | H04B 10/2581 |
| | | | | 398/26 |
| 2012/0177384 | A1* | 7/2012 | Ryf ................... | H04B 10/2581 |
| | | | | 398/202 |
| 2012/0207470 | A1* | 8/2012 | Djordjevic ............. | H04B 10/25 |
| | | | | 398/44 |
| 2012/0224861 | A1* | 9/2012 | Winzer ................... | G02B 6/14 |
| | | | | 398/143 |
| 2013/0077967 | A1* | 3/2013 | Woodward ............. | H04J 14/04 |
| | | | | 398/44 |
| 2013/0136404 | A1* | 5/2013 | Feuer ................. | G02B 6/02042 |
| | | | | 385/124 |
| 2013/0148963 | A1* | 6/2013 | Cvijetic .................. | H04J 14/04 |
| | | | | 398/45 |
| 2013/0209106 | A1* | 8/2013 | Mukasa ................. | H04J 14/02 |
| | | | | 398/79 |
| 2014/0079353 | A1* | 3/2014 | Fontaine ................. | G02B 6/28 |
| | | | | 385/14 |
| 2014/0126902 | A1* | 5/2014 | Swanson ................. | H04J 14/00 |
| | | | | 398/43 |
| 2014/0126915 | A1* | 5/2014 | Gruner-Nielsen . | H04B 10/2581 |
| | | | | 398/143 |
| 2014/0140694 | A1* | 5/2014 | Zhou ....................... | H04J 14/04 |
| | | | | 398/44 |
| 2014/0161439 | A1 | 6/2014 | Nolan | |
| 2014/0199066 | A1* | 7/2014 | Martelli ............. | H04B 10/2581 |
| | | | | 398/44 |
| 2014/0209798 | A1* | 7/2014 | Woodward ............... | G02B 6/04 |
| | | | | 250/227.28 |
| 2014/0270810 | A1* | 9/2014 | Nakashima ............ | H04B 10/66 |
| | | | | 398/208 |
| 2014/0286648 | A1* | 9/2014 | Buelow ................ | G02B 6/2808 |
| | | | | 398/143 |
| 2014/0314410 | A1* | 10/2014 | Mumtaz ............. | H04B 10/2581 |
| | | | | 398/65 |
| 2015/0030325 | A1* | 1/2015 | Chang ..................... | H04J 14/04 |
| | | | | 398/44 |
| 2015/0043910 | A1* | 2/2015 | Koebele .................. | H04J 14/04 |
| | | | | 398/44 |
| 2015/0171964 | A1* | 6/2015 | Rapp ....................... | H04J 14/00 |
| | | | | 398/58 |
| 2015/0229438 | A1* | 8/2015 | Le Taillandier De | |
| | | | Gabory ............. | H04B 10/2581 |
| | | | | 398/182 |
| 2016/0043794 | A1* | 2/2016 | Ashrafi ................ | H04B 7/0697 |
| | | | | 370/329 |
| 2016/0202142 | A1* | 7/2016 | Wang ................. | G01M 11/3109 |
| | | | | 356/73.1 |
| 2017/0264367 | A1* | 9/2017 | Awwad ............. | H04B 10/2581 |

OTHER PUBLICATIONS

Antonelli, Cristian, Mecozzi, Antonio, and Shtaif, Mark, "Modeling of linear and nonlinear coupling in multiple-mode fiber optic transmission with MIMO signal processing." pp. 1-6, Nov. 2012.

Arik, O. Sercan, Kahn, M. Joseph, and Ho Po-Keang, "MIMO Signal Processing for Mode-Division Multiplexing" IEEE Signal Processing Magazine, Feb. 12, 2014, pp. 1-10.

Juarez, A. Adrian, Warm, S, Bunge, C-A, Krummrich, P.M., and Petermann, K. "Perspectives of Principle Mode Transmission in a Multi-mode Fiber" ECOC, Sep. 2010, pp. 1-4, Torino, Italy.

Ly-Gagnon et al., "Coherent Detection of Optical Quadrature Phase-Shift Keying Signals with Carrier Phase Estimation," Journal of Lightwave Technology, vol. 24, No. 1, pp. 12-21, Jan. 2006.

Zhang, "Digital Signal Processing for Optical Coherent Communication Systems," DTU Fotonik, 2012.

Kahn and P. Ho, "A bottleneck for optical fibres" Nature, 411, 1007, 2001.

Essiembre et al, "Chapter 1: Fiber Nonlinearity and Capacity: Single-mode and Multimode Fibers", in Optical Fiber Transmission VIB, edited by Kaminow, Li, and Willner, 2013.

* cited by examiner

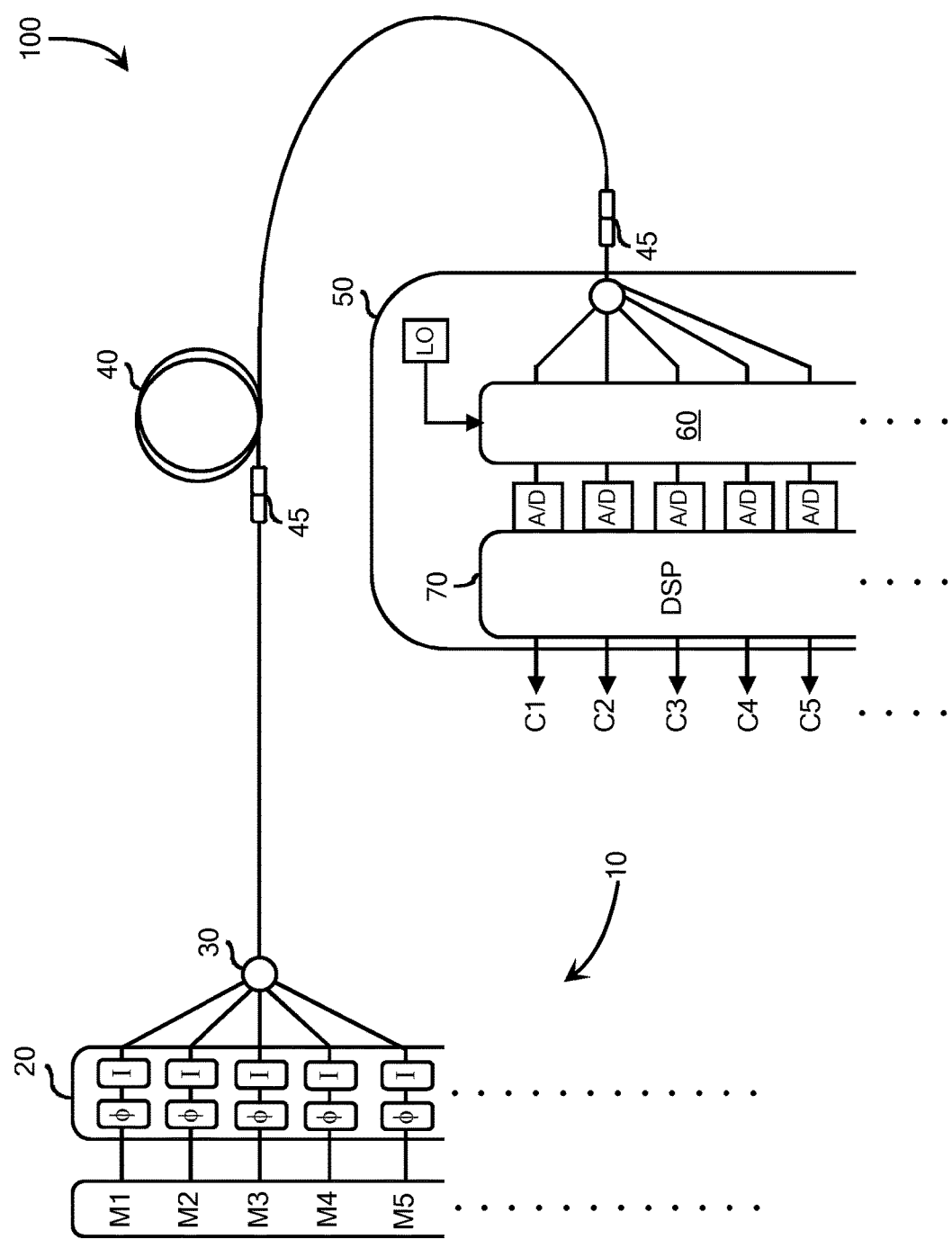

ALL-OPTICAL MODE DIVISION DEMULTIPLEXING

This application claims the benefit of priority under 35 U.S.C. § 371 of International Application No. PCT/US15/42562 filed on Jul. 29, 2015, which claims the benefit of priority to U.S. Application No. 62/030,182 filed on Jul. 29, 2014 the content of each of which is incorporated herein by reference in its entirety. This application is related to US PG Pub. No. 2014/0161439 A1 which is incorporated herein by reference in its entirety.

BACKGROUND

Multimode optical fibers have been introduced to increase transmission capacity in optical communications networks. Wavelength division multiplexing is utilized in these multi-channel fibers to enable the transmission of multiple optical modes in a single core or multiple distinct cores and help meet the explosive growth in the demands on network capacity. However, mode coupling, which causes the signals carried by specific modes to couple among each other, is a challenging technical issue in this context. A variety of approaches have been introduced to deal with the information scrambling resulting from this mode coupling.

Multiple-Input Multiple-Output communication in multi-mode optical fiber communication channels (MIMO) relies on coherent transmission with extensive fast forward error correction and electronic compensation to sort out scrambled signals. The principal states approach, as set forth in US PG Pub. No. 2014/0161439 A1, seeks to launch light into the normal modes of the optical system to limit mode coupling. Unfortunately, the components needed for generating, combining, and splitting these states are relatively complex and can be challenging to update and control.

BRIEF SUMMARY

The present disclosure relates primarily to a system and methodology by which N output modes of an optical communications link can be deconvolved to extract the input communication signals. More particularly, the multiple wavelength signals from the N simultaneously received modal signals can be decoded by measuring the output principal states and the received modal fields rather than modal power information.

According to some embodiments of the present disclosure, methods of decoding N superimposed coherent optical transmission modes transmitted along a multimode optical fiber, are provided where the method comprises (i) encoding, combining, and transmitting N coherent input optical signals (M1, M2, M3, . . . ) along a multimode optical fiber at a launching portion of a data transmission link, wherein the launching portion of the data transmission link comprises a data encoder and a mode combiner; (ii) detecting each of the N propagating optical signals as output optical signals at a receiving portion of the data transmission link, wherein the receiving portion of the data transmission link comprises coherent detection hardware and a digital signal processor; (iii) splitting the output optical signals into N optical detection channels of the coherent detection hardware; (iv) utilizing the coherent detection hardware to measure the phase and amplitude of the output optical signals as a vector field matrix $[\hat{e}]_{1 \times n}$ associated with the output modes, M; (v) utilizing the digital signal processor to determine output principal states $[PS_{Out}]_{1 \times n}$ of the output optical signals from the principal state eigenvectors of an output matrix corresponding to the N propagating optical signals at the receiving portion of the data transmission link; and (vi) utilizing the digital signal processor to extract the input optical signals $[M]_{In}$ from the output optical signals using the output principal states $[PS_{Out}]_{1 \times n}$, the vector field matrix $[\hat{e}]_{1 \times n}$ of the output optical signals, and a time delay τ of each output signal.

According to other embodiments of the present disclosure, optical signal receivers are provided for the execution of the methodology disclosed and contemplated herein.

BRIEF DESCRIPTION OF THE SEVERAL VIEWS OF THE DRAWINGS

The following detailed description of specific embodiments of the present disclosure can be best understood when read in conjunction with FIG. 1, which is a schematic illustration of a data transmission link that may be implemented in accordance with the concepts of the present disclosure.

DETAILED DESCRIPTION

FIG. 1 is a schematic illustration of a data transmission link 100 that may be implemented in accordance with the concepts of the present disclosure. It is contemplated that the data transmission link 100 may be configured as all or part of data transmission or telecommunication network, with varying degrees of complexity. Generally, in FIG. 1, respective coherent transmission modes M1, M2, M3, etc., are encoded with data and input at a launching portion 10 of the link 100 using a data encoder 20, which allows attributes of the respective coherent transmission modes M1, M2, M3, etc., to be controlled separately, and a mode combiner 30, which multiplexes the encoded transmission modes M1, M2, M3, etc., for propagation along a multimode optical fiber 40 via suitable fiber links 45. Although the data encoder 20 is illustrated schematically in FIG. 1 with reference to separate control of the phase and amplitude of N superimposed coherent transmission modes M1, M2, M3, etc., it is contemplated that the data encoder 20 may be additionally or alternatively configured to encode the polarization and/or other attributes of the N superimposed coherent transmission modes M1, M2, M3, etc. It is contemplated that the launching portion 10 of the data transmission link 100 of the present disclosure may be utilized to implement a variety of encoding schemes including, for example, a coherent optical MIMO (multiple-input, multiple-output) system.

The propagating signals are subsequently received and decoded at a receiving portion 50 of the data transmission link 100, which may also be referred to as an optical signal receiver and is illustrated schematically to comprise coherent detection hardware 60 (including a local oscillator LO) and a digital signal processor (DSP) 70. Analog-to-digital converters A/D are also provided to enable digital signal processing. The particular configuration of the coherent detection hardware 60 is beyond the scope of the present disclosure and may be gleaned from any of a variety of conventional or yet-to-be developed teachings on the subjects. See, for example, Ly-Gagnon et al., "Coherent Detection of Optical Quadrature Phase-Shift Keying Signals with Carrier Phase Estimation," Journal of Lightwave Technology, Vol. 24, No. 1, pp. 12-21, January 2006. The DSP 70 is programmed to cooperate with the coherent detection hardware 60 and to execute the signal processing algorithms of the present disclosure. Beyond this, the particular configuration of the DSP 70 is also beyond the scope of the present disclosure. Zhang, "Digital Signal Processing for Optical Coherent Communication Systems," DTU Fotonik, 2012, presents useful teachings on the subject that complement the present disclosure. Particular reference is made to Chapter 3 of Zhang: "Coherent Detection with DSP Algorithms."

US PG Pub. No. 2014/0161439 A1, teaches suitable hardware and methodology for generating principal state eigenvectors of an output matrix corresponding to N propagating optical signals at a receiving portion of a data transmission link. The aforementioned patent publication also teaches a matrix method that can be used to solve for the eigenvalues and eigenvectors of the principal states of the N propagating optical signals. These principal state eigenvalues and eigenvectors can be used to facilitate the signal decoding described herein.

More specifically, the present disclosure presents methodology and associated architecture for decoding N superimposed coherent optical transmission modes transmitted along a multimode optical fiber, in which mode coupling occurs. Referring to FIG. 1, given N coherent input optical signals (M1, M2, M3, . . . ) encoded, combined, and transmitted along a multimode optical fiber 40 at the launching portion 10 of the data transmission link 100, where N>1, each of the N propagating optical signals are detected as output optical signals at the receiving portion 50 of the data transmission link 100 by splitting the output optical signals into N optical detection channels of the coherent detection hardware 60 of the receiving portion 50.

The coherent detection hardware 60 is used to measure the phase and amplitude of the output optical signals as a vector field at each modal position designated with a matrix $[\hat{e}]_{1 \times n}$ and the digital signal processor 70 determines the output principal states $[PS_{Out}]_{1 \times n}$ of the output optical signals from the principal state eigenvectors of an output matrix corresponding to the N propagating optical signals at the receiving portion 50 of the data transmission link 100. The digital signal processor 70 subsequently extracts the input optical signals $[M]_{In}$ from the output optical signals using the output principal states $[PS_{Out}]_{1 \times n}$, the vector field matrix $[\hat{e}]_{1 \times n}$ of the output optical signals, and a time delay $\tau$ of each output signal. This extraction process is described from the three different perspectives herein: first, with a general reference to calculating the complex transpose of the output principal states of polarization (PSPs); second, with general reference to deconvolving the input principal states; and third, with a more specific reference to using $[\gamma]_{n \times n}$.

More specifically, the digital signal processor can be used to determine the superimposed input states $[S_{In}]_{1 \times n}$ of the input optical signals $[M]_{In}$ from the output principal states $[PS_{Out}]_{1 \times n}$ of the output optical signals $[M]_{Out}$ by calculating the complex transpose of the output principal states $[PS_{Out}]_{1 \times n}$. The generalized transfer matrix [H] of the system can then be calculated from the superimposed input states $[S_{In}]_{1 \times n}$ and the output principal states $[PS_{Out}]_{1 \times n}$ according to:

$$[PS_{Out}]_{1 \times n} = [H][S_{In}]_{1 \times n}.$$

M1, M2, M3, . . . can then be extracted based at least in part on the relation $$[M]_{In} = [H]^{-1}[M]_{Out}$$

where the input optical signals $[M]_{In}$ are represented as follows:

$$[M]_{In} = (M1, M2, M3, \ldots).$$

From a different perspective, the methodology and architecture of the present disclosure may be described with reference to the use of the digital signal processor 70 to initially determine the superimposed input states $[S_{In}]_{1 \times n}$ of the input optical signals $[M]_{In}$ from the output principal states $[PS_{Out}]_{1 \times n}$ of the output optical signals $[M]_{Out}$. Subsequently, the input optical signals $[M]_{In}$ are determined by deconvolving $[S_{In}]_{1 \times n}$ at least partially according to $$[M]_{In} = [D][S_{In}]_{1 \times n}; \text{ and}$$

M1, M2, M3, . . . are extracted from $[M]_{In}$, where $[M]_{In} = $ (M1, M2, M3, . . . ), and [D] is a matrix establishing a relationship between the superimposed input states and the combined input optical signals From another perspective, the methodology and architecture of the present disclosure may be described with reference to the initial determination of $[a]_{n \times n}$ from the measured vector field matrix $[\hat{e}]_{1 \times n}$ and the output principal states $[PS_{Out}]_{1 \times n}$ at least partially according to $$[PS_{Out}]_{1 \times n} = [a]_{n \times n}[\hat{e}]_{1 \times n}.$$

Where $[a]_{n \times n}$ relates the output modes to the output principal states as described in US2014/016,439 A1, hereby incorporated by reference in its entirety. The superimposed input states $[S_{In}]_{1 \times n}$ can be subsequently related to the vector fields $f_{In}$ of the input optical signals (M1, M2, M3, . . . ) at least partially according to $$[f_{In} S_{In}]_{1 \times n} = [\gamma]_{n \times n}[\hat{e}]_{1 \times n}$$

where the elements of $[\gamma]_{n \times n}$ are constructed from $[a]_{n \times n}$, time dependent vector fields $f_j$ of the output optical signals, and propagation constants $\beta_i$ associated with the time dependent vector fields $f_j$. Accordingly, M1, M2, M3, . . . can be determined at least partially from the vector fields $f_{In}$, where $[M]_{In} = $ (M1, M2, M3, . . . ). From this perspective, the digital signal processor 70 can be programmed to determine the elements of $[\gamma]_{n \times n}$ at least partially according to $$[\gamma]_{n \times n} = \begin{bmatrix} a_{11} e^{-j\beta_1 z} f_1 & a_{12} e^{-j\beta_1 z} f_2 & \cdots \\ a_{21} e^{-j\beta_2 z} f_1 & a_{22} e^{-j\beta_2 z} f_2 & \vdots \\ \vdots & \cdots & \ddots \end{bmatrix}$$

where $a_{11}$, $a_{12}$, . . . are elements of $[a]_{n \times n}$, j is the imaginary number, $\beta_1$, $\beta_2$, . . . , are the propagation constants associated with the principal states time delays, i.e., the eigenvalues of the principal states eigenvalue equation, z is the length of the optical fiber 40, and $f_1$, $f_2$, . . . are the time dependent vector fields of the output optical signals. In one embodiment, it is contemplated that the digital signal processor 70 can be programmed to determine the propagation constants $\beta_i$ at least partially according to $$\beta_i = \tau_i kc$$

where $k = 2\pi/\lambda$ and c is the speed of light.

To determine the input modulated fields, the equation $$[f_{In} S_{In}]_{1 \times n} = [\gamma]_{n \times n}[\hat{e}]_{1 \times n}$$

can be expanded to give $$S1_{In} = a_{11} e^{-j\beta_1 z} f_1 \hat{m}_1 + a_{12} e^{-j\beta_1 z} f_2 \hat{m}_2 + a_{13} e^{-j\beta_1 z} f_3 \hat{m}_3 + \ldots$$

$$S2_{In} = a_{21} e^{-j\beta_2 z} f_1 \hat{m}_1 + a_{22} e^{-j\beta_2 z} f_2 \hat{m}_2 + a_{23} e^{-j\beta_2 z} f_3 \hat{m}_3 + \ldots$$

$$S3_{In} = a_{31} e^{-j\beta_3 z} f_1 \hat{m}_1 + a_{32} e^{-j\beta_3 z} f_2 \hat{m}_2 + a_{33} e^{-j\beta_3 z} f_3 \hat{m}_3 + \ldots$$

where $\hat{m}$ represents the specific polarization mode to be detected. The resulting matrix can be diagonalized such that the diagonal components of the diagonalized matrix are the input modulated fields.

As a result of this method, by using this algorithm and the measured output principal states as in US 2014/016,439 A1, one can deconvolve N output signals using time independent mode multiplexing and demultiplexing components, thereby eliminating the need to provide time dependent multiplexing and demultiplexing as described in US 2014/016,439 A1. These components, as described therein, are required to multiplex and demultiplex the superimposed principal states which will vary in time.

It is noted that recitations herein of a component of the present disclosure being "programmed" or "configured" in a particular way, to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

What is claimed is:

1. A method of decoding N combined coherent optical transmission modes transmitted along a multimode optical fiber, where N>1, and the method comprises:
    encoding, superimposing, and transmitting N coherent input optical signals $[M]_{In}$ along a multimode optical fiber at a launching portion of a data transmission link, wherein the launching portion of the data transmission link comprises a data encoder and a mode combiner;
    detecting each of the N propagating optical signals as output optical signals $[M]_{Out}$ at a receiving portion of the data transmission link, wherein the receiving portion of the data transmission link comprises coherent detection hardware and a digital signal processor;
    splitting the output optical signals $[M]_{Out}$ into N optical detection channels at the coherent detection hardware;
    utilizing the coherent detection hardware to measure phase and amplitude of the output optical signals $[M]_{Out}$ as a vector field matrix $[\hat{e}]_{1 \times n}$;
    utilizing the digital signal processor to determine output principal states $[PS_{Out}]_{1 \times n}$ of the output optical signals $[M]_{Out}$ from principal state eigenvectors of an output matrix corresponding to the N propagating optical signals at the receiving portion of the data transmission link; and
    utilizing the digital signal processor to extract the input optical signals $[M]_{In}$ from the output optical signals $[M]_{Out}$ using the output principal states $[PS_{Out}]_{1 \times n}$, the vector field matrix $[\hat{e}]_{1 \times n}$ of the output optical signals $[M]_{Out}$, and a time delay T of each output signal.

2. A method as claimed in claim 1 wherein the method further comprises:
    utilizing the digital signal processor to determine superimposed input states $[S_{In}]_{1 \times n}$ of the input optical signals $[M]_{In}$ from the output principal states $[PS_{Out}]_{1 \times n}$ of the output optical signals $[M]_{Out}$ by calculating a complex transpose of the output principal states $[PS_{Out}]_{1 \times n}$;
    utilizing the digital signal processor to calculate a transfer matrix [H] of the system from the superimposed input states $[S_{In}]_{1 \times n}$ and the output principal states $[PS_{Out}]_{1 \times n}$, where $[PS_{Out}]_{1 \times n} = [H][S_{In}]_{1 \times n}$, and to extract M1, M2, M3, . . . based at least in part on the relation $[M]_{In} = [H']^{-1}[M]_{Out}$ where $[M]_{In} = (M1, M2, M3, \ldots)$.

3. A method as claimed in claim 1 wherein the method further comprises utilizing the digital signal processor to:
    determine superimposed input states $[S_{In}]_{1 \times n}$ of the input optical signals $[M]_{In}$ from the output principal states $[PS_{Out}]_{1 \times n}$ of the output optical signals $[M]_{Out}$;
    determine the input optical signals $[M]_{In}$ by deconvolving $[S_{In}]_{1 \times n}$ at least partially according to $[M]_{In} = [D][S_{In}]_{1 \times n}$; and extract M1, M2, M3, . . . from $[M]_{In}$, where $[M]_{In}$=(M1, M2, M3, . . . ).

4. A method as claimed in claim 1 wherein the digital signal processor:
    determines $[a]_{n \times n}$ from the measured vector field matrix $[\hat{e}]_{1 \times n}$ and the determined output principal states $[PS_{Out}]_{1 \times n}$ at least partially according to $[PS_{Out}]_{1 \times n} = [a]_{n \times n}[\hat{e}]_{1 \times n}$;

relates the superimposed input states $[S_{In}]_{1 \times n}$ to vector fields $f_{In}$ of the input optical signals $[M]_{In}$ at least partially according to $[f_{In}S_{In}]_{1 \times n} = [y]_{n \times n}[\hat{e}]_{1 \times n}$ where the elements of $[y]_{n \times n}$ are constructed from $[a]_{n \times n}$, time dependent vector fields $f_j$ of the output optical signals $[M]_{Out}$, and propagation constants $B_j$ associated with the time dependent vector fields $f_j$; and
    determines M1, M2, M3, . . . at least partially from the vector fields $f_{In}$, where $[M]_{In}$=(M1, M2, M3, . . . ).

5. A method as claimed in claim 4 wherein the digital signal processor determines the elements of $[Y]_{n \times n}$ at least partially according to $[Y]_{n \times n} = [a_{11}e^{-\beta_1}f_1 a_{12}e^{-\beta_1}f_2 \ldots a_{21}e^{-\beta_2}f_1 a_{21}e^{-\beta_2}f_2 \ldots]$ where $a_{11}, a_{12}, \ldots$ are elements of $[a]_{n \times n}$, $\beta_1, \beta_2, \ldots$ are the propagation constants associated with principal states time delays, and $f_1, f_2, \ldots$ are the time dependent vector fields of the output optical signals $[M]_{Out}$.

6. A method as claimed in claim 5 wherein the digital signal processor determines the input optical signals $[M]_{In}$ by: expanding $[f_{In}S_{In}]_{1 \times n} = [Y]_{n \times n}[\hat{e}]_{1 \times n}$ to give S1.sub.In=a.sub.11e.sup.-j.beta..sup.1.sup.zf.sub.1 [circumflex over (m)].sub.1+a.sub.12e.sup.-j.beta..sup.1.sup.zf.sub.2[circumflex over (m)].sub.2+a.sub.13e.sup.-j.beta..sup.1.sup.zf.sub.3[circumflex over (m)].sub.3+ . . .

$S2_{In} = a_{21}e^{-j\beta_2 z}\hat{m}_1 + a_{22}e^{-j\beta_2 z}\hat{m}_2 + a_{23}e^{-j\beta_2 z}\hat{m}_3 + \ldots$ $S3_{In} = a_{31}e^{-j\beta_3 z}\hat{m}_1 + a_{32}e^{-j\beta_3 z}\hat{m}_2 + a_{33}e^{-j\beta_3 z}\hat{m}_3 + \ldots$ where $\hat{m}$ represents a specific polarization mode to be detected; and diagonalizing the resulting matrix such that diagonal components of the diagonalized matrix represent input modulated fields of the input optical signals $[M]_{In}$.

7. A method as claimed in claim 4 wherein the digital signal processor determines the propagation constants $\beta_i$ at least partially according to $$\beta_i = \tau_i k c$$

where $k = 2\pi/\lambda$ and c is the speed of light.

8. An optical communications system using the method as in claim 1, and the output principal states $[PS_{Out}]_{1 \times n}$ deconvolve N output signals using mode multiplexing and demultiplexing components.

9. An optical signal receiver comprising coherent detection hardware and a digital signal processor programmed to cooperate with the coherent detection hardware to decode N superimposed coherent optical transmission modes transmitted as N coherent input optical signals $[M]_{In}$ along a multimode optical fiber, where N>1, wherein the decoding comprises:

detecting each of the N propagating optical signals as output optical signals $[M]_{Out}$;
  splitting the output optical signals $[M]_{Out}$ into N optical detection channels at the coherent detection hardware;
  utilizing the coherent detection hardware to measure phase and amplitude of the output optical signals $[M]_{Out}$ as a vector field matrix $[\hat{e}]_{1 \times n}$;
  utilizing the digital signal processor to determine output principal states $[PS_{Out}]_{1 \times n}$ of the output optical signals $[M]_{Out}$ from principal state eigenvectors of an output matrix corresponding to the N propagating optical signals at a receiving portion of a data transmission link; and
  utilizing the digital signal processor to extract the input optical signals $[M]_{In}$ from the output optical signals $[M]_{Out}$ using the output principal states $[PS_{Out}]_{1 \times n}$, the vector field matrix $[\hat{e}]_{1 \times n}$ of the output optical signals $[M]_{Out}$, and a time delay T of each output signal.

10. An optical signal receiver as claimed in claim 9 wherein the digital signal processor is programmed such that the decoding further comprises:

utilizing the digital signal processor to determine superimposed input states $[S_{In}]_{1 \times n}$ of the input optical signals $[M]_{In}$ from the output principal states $[PS_{Out}]_{1 \times n}$ of the output optical signals $[M]_{Out}$ by calculating a complex transpose of the output principal states $[PS_{Out}]_{1 \times n}$;

utilizing the digital signal processor to calculate a transfer matrix $[H]$ of the system from the superimposed input states $[S_{In}]_{1 \times n}$ and the output principal states $[PS_{Out}]_{1 \times n}$, where $[PS_{Out}]_{1 \times n} = [H][S_{In}]_{1 \times n}$, and to extract M1, M2, M3, . . . based at least in part on the relation $[M]_{In} = [H^T]^{-1} [M]_{Out}$ where $[M]_{In} = (M1, M2, M3, \ldots)$.

11. An optical signal receiver as claimed in claim 9 wherein the digital signal processor is programmed such that the decoding further comprises:

determining superimposed input states $[S_{In}]_{1 \times n}$ of the input optical signals $[M]_{In}$ from the output principal states $[PS_{Out}]_{1 \times n}$ of the output optical signals $[M]_{Out}$;
  determining the input optical signals $[M]_{In}$ by deconvolving $[S_{In}]_{1 \times n}$ at least partially according to $[M]_{In} = D[S_{In}]_{1 \times n}$; and extracting M1, M2, M3, . . . from $[M]_{In}$, where $[M]_{In} = (M1, M2, M3, \ldots)$.

12. An optical signal receiver as claimed in claim 9 wherein the digital signal processor is programmed such that the decoding further comprises:

determining $[a]_{n \times n}$ from the measured vector field matrix $[\hat{e}]_{1 \times n}$ and the determined output principal states $[PS_{Out}]_{1 \times n}$ at least partially according to $[PS_{Out}]_{1 \times n} = [a]_{n \times n} [\hat{e}]_{1 \times n}$;

relating the superimposed input states $[S_{In}]_{1 \times n}$ to vector fields $f_{In}$ of the input optical signals $[M]_{In}$ at least partially according to $[f_{In} S_{In}]_{1 \times n} = [y]_{n \times n} [\hat{e}]_{1 \times n}$ where the elements of $[y]_{n \times n}$ are constructed from $[a]_{n \times n}$, time dependent vector fields $f_j$ of the output optical signals $[M]_{Out}$ and propagation constants $B_i$ associated with the time dependent vector fields $f_j$; and
  determining M1, M2, M3, . . . at least partially from the vector fields $f_{In}$, where $[M]_{In} = (M1, M2, M3, \ldots)$.

13. An optical signal receiver as claimed in claim 12 wherein the digital signal processor determines the elements of $[Y]_{n \times n}$ at least partially according to $[Y]_{n \times n} = [a_{11} e^{-\beta_1} f_1 a_{12} e^{-\beta_1} f_2 \ldots a_{21} e^{-\beta_2} f_1 a_{21} e^{-\beta_2} f_2 \ldots]$ where $a_{11}, a_{12}, \ldots$ are elements of $[a]_{n \times n}$, $\beta_1, \beta_2, \ldots$, are the propagation constants associated with time dependent vector fields of the output optical signals $[M]_{Out}$, and $f_1, f_2, \ldots$ are the time dependent vector fields of the output optical signals $[M]_{Out}$.

14. An optical signal receiver gas claimed in claim 12 wherein the digital signal processor determines the propagation constants $\beta_i$ at least partially according to $$\beta_i = \tau_i k c$$

where $k = 2\pi/\lambda$ and c is the speed of light.

* * * * *

UNITED STATES PATENT AND TRADEMARK OFFICE
CERTIFICATE OF CORRECTION

PATENT NO. : 10,027,416 B2
APPLICATION NO. : 15/329074
DATED : July 17, 2018
INVENTOR(S) : Robert R Alfano et al.

Page 1 of 1

It is certified that error appears in the above-identified patent and that said Letters Patent is hereby corrected as shown below:

In the Claims

Column 6, Line 62, Claim 6, after "[Y]n×n" delete "]".

Column 8, Line 52, Claim 14, delete "gas" and insert -- as --, therefor.

Signed and Sealed this
Twenty-eighth Day of July, 2020

Andrei Iancu
*Director of the United States Patent and Trademark Office*